M. JUDD.
SASH FASTENER.
No. 39,052. Patented Mar. 30, 1863.
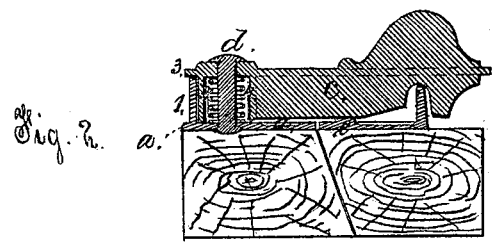
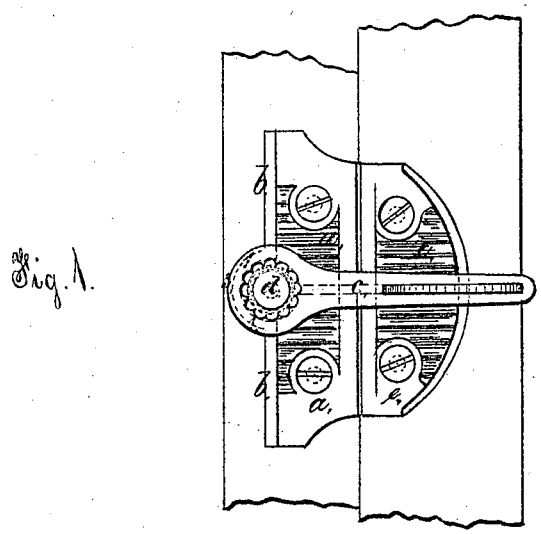

UNITED STATES PATENT OFFICE.

MORTON JUDD, OF NEW BRITAIN, CONNECTICUT.

IMPROVEMENT IN SASH-FASTENERS.

Specification forming part of Letters Patent No. 39,052, dated June 30, 1863.

*To all whom it may concern:*

Be it known that I, MORTON JUDD, of New Britain, in the county of Hartford and State of Connecticut, have invented, made, and applied to use a certain new and useful Improvement in Sash-Fasteners; and I do hereby declare the following to be a full, clear, and exact description of my said invention, reference being had to the annexed drawings, making part of this specification, wherein—

Figure 1 is a plan of said fastener, and Fig. 2 is a vertical section of the same.

Similar letters denote the same parts.

The nature of my said invention consists in a peculiar construction of joint at the back end of the lever at the point of connection to the plate on the sash, whereby greater strength is obtained at this point than heretofore, at the same time that the parts are very easily and cheaply constructed, and I make use of a short helical spring around the fulcrum-pin of this lever to keep the parts in contact with sufficient friction to prevent the parts becoming too loose.

In the drawings, $a$ is a plate with a flange, $b$, in which is a circular recess at 1, taking one side of the hub 2 of the lever $c$.

3 is a flange around this hub 2, setting upon the top edge of this flange $b$, and $d$ is a pin or screw passing through the lever $c$ and plate $a$, and connecting the parts together. I prefer that said pin should be riveted up. The hub 2 is hollow, and contains a helical spring, 4, which, setting around the pin $d$ and resting at the lower end upon the plate $a$, produces a sufficient friction to hold the lever $c$ in any position in which it may be placed.

$e$ is the plate on the other part of the sash or casing to the plate $a$, and over which plate the said lever $c$ is turned to secure the sashes. The construction of this plate $a$, with the flange $b$ and recess 1, strengthens said plate, and the hub 2 and flange 3, setting within the recess, with the latter above the edge of this flange, make a very secure joint that is not likely to be broken in use, and the strength is fully equal to such sash-fasteners as are formed with the lever between an overhanging flange and the plate. By this construction I am enabled to make my fastener of cast metal at a very cheap rate, because there is very little hand-labor required on my said fastener.

What I claim, and desire to secure by Letters Patent, is—

1. The lever $c$, with the flange 3 around the hub 2, setting over the flange $b$ on the plate $a$, as specified.

2. The hollow hub 2 and spring 4, to retain the lever $c$ in position, as specified.

In witness whereof I have hereunto set my signature this 6th day of May, 1863.

MORTON JUDD.

Witnesses:
S. E. CASE,
F. T. STANLEY.